Dec. 24, 1963     P. H. REARDON     3,114,992
METHOD FOR MAKING LENS BLOCKERS
Filed Dec. 7, 1960     2 Sheets-Sheet 1

INVENTOR
Patrick H. Reardon
BY
Stevens, Davis, Miller & Mosher
ATTORNEYS

Dec. 24, 1963 P. H. REARDON 3,114,992
METHOD FOR MAKING LENS BLOCKERS
Filed Dec. 7, 1960 2 Sheets-Sheet 2
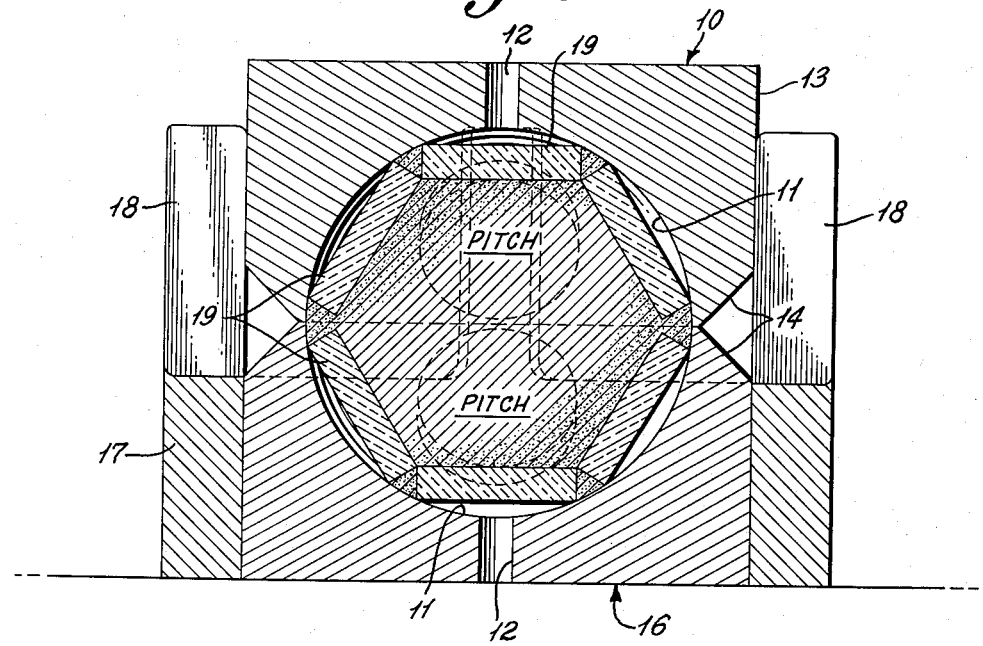
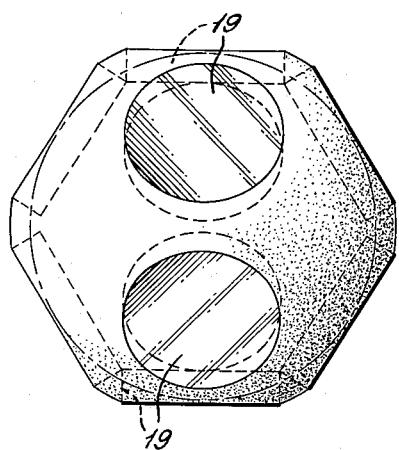
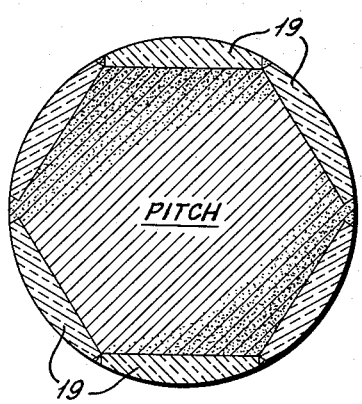
INVENTOR
Patrick H. Reardon
BY
Stevens, Davis, Miller & Mosher
ATTORNEYS

United States Patent Office 3,114,992
Patented Dec. 24, 1963

3,114,992
METHOD FOR MAKING LENS BLOCKERS
Patrick H. Reardon, Hagerstown, Md., assignor to The Lionel Corporation, a corporation of New York
Filed Dec. 7, 1960, Ser. No. 74,380
4 Claims. (Cl. 51—284)

This invention relates to the grinding of lenses and more particularly to the preparation of blocker balls of a type suitable for the grinding and polishing of lenses in apparatus such as that shown in Patents 2,686,391; 2,703,470; and 2,722,785.

In Patent No. 2,686,391 there are shown in FIGURES 6, 7 and 8 blocker balls which, at the time of the development of the invention embodied in said patent, were made of annealed bearing steel. The balls were machined or cast to provide each with symmetrically disposed radial cavities in the form of short right cylinders with their centers radial of the ball. Right cylindrical lens blanks were cemented into the cavities and, when cemented, a portion of each lens blank projected beyond the spherical surface of the ball. During grinding and polishing the glass was worn away so that eventually one end surface of each lens blank conformed to the curvature of the ball. The result was simultaneous production of a large number of plano-convex lenses.

While the blocker balls described in Patent 2,686,391 were satisfactory in the production of lenses, they were costly to produce and their useful life was short enough so that their replacement was an item of economic importance. Furthermore, the projecting portions of the lens blanks in some instances increased the difficulty in producing a uniform grinding in all radii of the sphere and sometimes caused breakage of the blanks. Further, due to machining difficulties, the blockers shown in Patent 2,686,391 are for all practical purposes capable of use only with right cylindrical blanks.

It is an object of the present invention to provide novel methods for the production of a new and superior blocker ball for use in the grinding and polishing of plano-convex lenses. The method of the present invention is simple, reliable, and inexpensive, and affords the advantage that the blocker ball, as originally made, has its surface of maximum radius already curved to protect the blanks during the early stages of grinding and is capable of accommodating blanks of round as well as other peripheral contours.

It is proposed according to the present invention to produce a blocker ball made wholly of blocker pitch and lens blanks having parallel surfaces normal to a radius of the ball characterized by the fact that the outer surface of the pitch conforms to the surface of a sphere, and the surface of each lens blank lies chordwise of that sphere, the grinding operation having the effect of reducing the diameter of the ball by the simultaneous wearing away of the pitch and the glass to produce simultaneously plano-convex lenses, the convex surface of which conforms to the curvature of the ground ball of reduced diameter.

Other objects and advantages of this invention will be apparent upon consideration of the following detailed description of an embodiment thereof in conjunction with the annexed drawings wherein:

FIGURE 4 is a view in diametric section taken through the mold after the ball has been assembled;

FIGURE 5 is a view in elevation showing the blocker as it appears when it emerges from the mold; and FIGURE 6 is a view in section of the same blocker after the grinding operation has been completed, and it has been ground to a true sphere.

Figure 1:
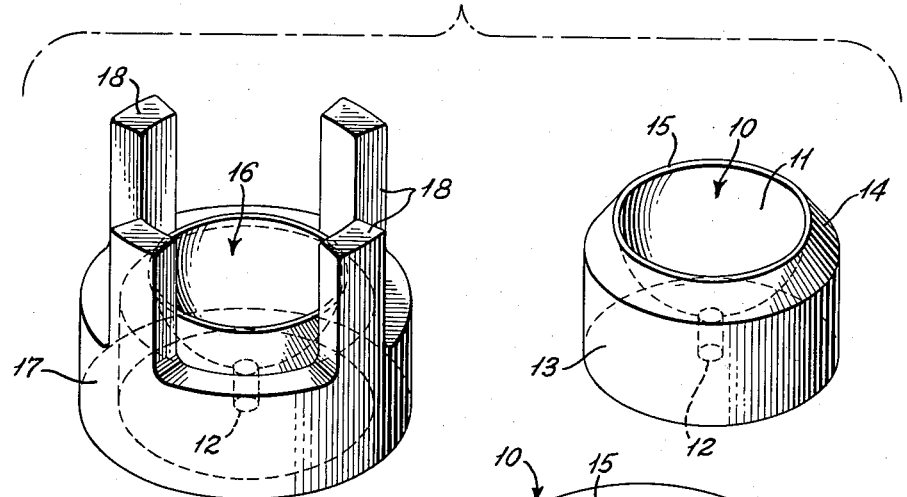
FIGURE 1 is a perspective view of mold elements used in producing blocker balls according to the present invention.

Referring now to the drawings in greater detail, there are shown in FIGURE 1 three parts; two molds and a guide. The mold 10 is a single unitary body, having therein a hemispherical cavity 11 and a radial port 12 through the bottom of the mold which communicates with the hemispherical cavity 11. The outer side walls 13 of the mold are cylindrical and at right angles to the flat bottom face of the mold. The upper edge of the mold 10 is beveled at 14 to provide a cutting edge at 15. The mold 16, shown to the left of FIGURE 1 is identical to mold 10 just described. Since this mold is identical to mold 10, like numerals are used to describe like parts thereof. Mold 16 is shown in position in the mold guiding device. This device has an interior cylindrical surface complementary to the exterior surface of the molds 10 and 16. This interior surface is defined by a hollow cylindrical portion 17 and integral fingers or projections 18 together being of a height equal to the sum of the heights of the molds 10 and 16 when they are stacked with their edges 15 in mutual contact.

Figure 2:
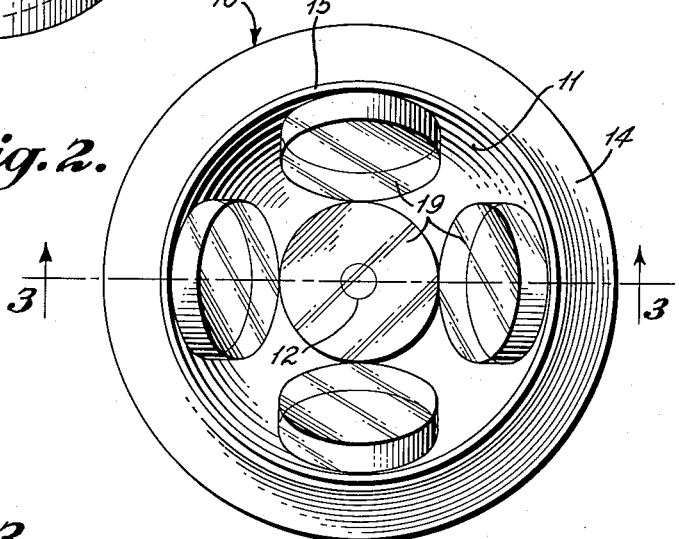
FIGURE 2 is a top plan view to an enlarged scale of one of the mold elements of FIGURE 1, with lens blanks in position therein.
Figure 3:
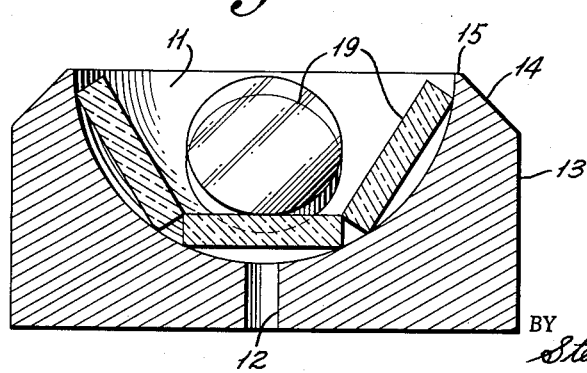
FIGURE 3 is a view in section taken on the line 3—3 of FIGURE 2.

To practice the method of the present invention, one of the molds, let us say the mold 10 (see FIGURE 2), has its interior, concave, hemispherical surface 11 lined with a plurality of lens blanks 19 which may be right cylindrical. Five of these are shown in FIGURE 2. As can be seen in FIGURE 3, each of these lens blanks lies with one end face chordwise of the hemispherical cavity 11. The bottom lens blank 19 lies over and in registry with the port 12.

In practicing the method of the present invention each of the molds 10 and 16 is lined with blanks in the manner shown in FIGURE 3. The blanks are preheated by a torch after the mold is lined or preheated before lining of the mold. Thereafter, molten pitch is poured into the mold to the level of the edge at 15 which is, of course, at the level of the diameter of the sphere. The pitch does not flow under the lens blanks where the end surfaces thereof run chordwise of the hemisphere, but instead there is produced a hemisphere of pitch and lens blanks having a plurality of chordwise flats representing the outer face of the lens blanks. Because the lens blanks are warm the pitch adheres well to them. The mold 10 and the mold 16 are both filled with pitch in the same manner, thereafter one of them, for example the mold 16, is placed face up (edge 15 up) in the guide as shown on the left side of FIGURE 1. The other mold, say the mold 10, is then placed face down (edge 15 against edge 15 of mold 16) in the mold guide so that the two diametric faces of pitch abut one another. Cooling of the pitch in the mold will cause a shrinkage, making each surface slightly concave. A little molten or powdered pitch can be added and the two surfaces softened by heat just as this operation is performed. The two molds with the softened pitch faces are then pressed together, extruding any surplus pitch and insuring a perfect sphere tightly bonded.

As soon as the pitch bonding the two hemispheres together is hardened, which is substantially instantly, the upper mold 10, see FIGURE 4, is lifted out of the holder, the operator reaching the side wall 13 of the mold by placing his fingers between the projections 18. At this stage a hemispherical part of the blocker is projecting from the mold 16. The remaining half of the resulting blocker is pushed out of the mold 16 by pushing a tool through the port at 12 against the lens blank that registers therewith. The resulting body has the appearance depicted in FIGURE 5 of the drawings. Notice that the surfaces of the pitch all conform to a portion of the surface of the sphere, while the outer end face of the lens blanks are chordwise of the same sphere. This ball is ground, for example, by the method shown in Patent 2,703,470, and thereafter has the appearance shown in FIGURE 6. Without removing the lens blanks, the polishing operation can be performed.

The pitch used in the practice of the present invention is ordinary commercial blocker pitch. Blocker pitches of many different compositions are well known to the art. Many of these are satisfactory for the practice of the present invention.

The pitch chosen should melt at about 212° to 230° F. and should stick to the lens blanks when they are warm, say at temperatures between 125° and 230° F. It should be structurally stable at room temperature. Such pitches in general become brittle at temperatures slightly below 32° F. and this property is used to release the ground lenses from the blocker after grinding, i.e., in the FIGURE 6 condition. When the pitch is cool the lenses may be picked from the blocker easily and the remaining body of pitch may be remelted and reused. During grinding and polishing, since the grinding compositions are aqueous suspensions, there is no difficulty about getting the pitch so hot that it will deform. Grinding pitches have little tendency to stick to the steel of the molds but the operaor ordinarily lightly coats each mold with a lubricant such as petroleum jelly before lining it with the lens blanks shown in FIGURE 3. Because the pitch has little tendency to stick to the mold, lifting off the top mold, for example the mold 10 of FIGURE 4, is quite easy. The blocker is pushed out of the bottom mold by simply pushing a tool through the port 12 against the face of one of the lens blanks. The distribution of the lens blanks within the concave hemisphere can be accomplished at random so long as each lens blank presents a face which is chordwise to the hemisphere. Whether or not the lens blank is circular, it must seat against the mold so that the faces of the blank are normal to a radius of the spherical mold. With a cylindrical lens blank the periphery of the outer face wholly contacts the mold. With a square or triangular blank all of the corners must touch the mold face.

The grinding operation, of course, results in reduction in diameter of the blocker from the FIGURE 5 to the FIGURE 6 size. The only effect in a small difference in diameter is an unimportant minor difference in the focal length of the lens, so that calipering the ball at the end of the grinding operation is fairly simple. When the polishing operation has been completed the balls are cooled to about 25° F. and the blanks are removed from the pitch.

While the present invention has been described with respect to lens blanks which are relatively large in relation to the hemisphere, for example the lens blanks may be as large as ⅝ inch diameter on a ball of 1½ inch diameter approximately, or on a ball of like diameter they may be as small as ⅛ inch, the disposition being entirely random so long as each lens is kept with its face normal to a radius of the sphere.

While it has been pointed out with respect to the specific example shown in the drawing that the outer faces of the right cylindrical lens blanks are not coated with pitch when the mold is filled, it will be realized that if large blanks of non-circular section are placed in the mold with their outer faces normal to a radius of the hemisphere the pitch will run under them. On the other hand, if the lens blanks are square and small in relation to the right cylindrical ones illustrated in the drawings hereof, they have a tendency to group themselves in such a way that very little pitch gets through to overlie the face which is to be ground. If pitch does get in this position, no harm is done because the pitch and glass are worn away together during the grinding.

What I claim is:

1. The method of preparing lens blanks for grinding that comprises arranging a plurality of said blanks each with its face to be ground disposed chordwise to a common concave hemisphere, covering said blanks with blocking pitch to a level of the diameter of said hemisphere while they are so arranged, allowing the resulting body to harden and thereafter bonding the same along its diameter to another like body whereby to produce a blocker ball the pitch surfaces of which conform to the surface of a sphere and the glass surfaces of which lie in planes chordwise of said sphere and normal to a radius thereof.

2. The method of preparing right cylindrical lens blanks for grinding that comprises arranging a plurality of said blanks each with the whole periphery of one end face contacting a common hemisphere, covering said blanks with pitch to a level of the diameter of said hemisphere while they are so arranged, allowing the resulting body to harden and thereafter bonding the same along its diameter to another like body whereby to produce a blocker ball the pitch surfaces of which conform to the surface of a sphere and the glass surfaces of which are circular flats in planes chordwise of said sphere.

3. The method of preparing lens blanks for grinding that comprises arranging a plurality of said blanks each with an end face to be ground disposed chordwise of one of a pair of concave hemispherical molds, filling each of said molds with pitch, and thereafter sticking the resulting hemispherical bodies together in diametrical registry, and, after hardening of the pitch, removing the resulting body from the molds.

4. The method of preparing lens blanks for grinding that comprises arranging a plurality of said blanks each with its face to be ground disposed chordwise of one of a pair of concave hemispherical molds at least one of which has a port therethrough, an end face of one of said blanks registering with said port, filling each of said molds with pitch, thereafter registering the molds in sphere defining position while bonding together the two hemispheres of pitch, pulling off one of said molds from the resulting body and punching out through said port the resulting body from the other mold.

References Cited in the file of this patent

UNITED STATES PATENTS

| | | |
|---|---|---|
| 2,007,366 | Clement | July 9, 1935 |
| 2,224,168 | Tillyer et al. | Dec. 10, 1940 |
| 2,358,259 | Siedschlag et al. | Sept. 12, 1944 |
| 2,582,087 | Turner et al. | Jan. 8, 1952 |
| 2,585,287 | Turner et al. | Feb. 12, 1952 |
| 2,595,760 | Butler | May 6, 1952 |
| 2,683,342 | Dalton | July 13, 1954 |
| 2,686,391 | Porter et al. | Aug. 17, 1954 |
| 2,838,892 | Blash | June 17, 1958 |
| 2,982,061 | Dillion | May 2, 1961 |

FOREIGN PATENTS

| | | |
|---|---|---|
| 481,202 | Canada | Feb. 19, 1952 |